Patented Dec. 22, 1942

2,306,147

UNITED STATES PATENT OFFICE 2,306,147

TREATMENT OF WATER

Edward R. Williams, Pittsburgh, Pa., assignor of one-half to Ella E. Williams, Pittsburgh, Pa.

No Drawing. Application July 15, 1939, Serial No. 284,701

4 Claims. (Cl. 210—23)

This invention relates to the treatment of water to condition it for use, and to compositions therefor.

It is among the objects of the invention to provide a method of treating water to prepare it for use in the washing of fabrics, glass, chinaware, floors, walls, and the like, in textile production, and, generally, for uses to which water is put which involve detergent or cleansing functions, which is cheap, readily practiced, reduces the costs of such operations, is not injurious to the materials treated, is applicable to residential, industrial and institutional uses, and possesses other advantages which will appear hereinafter, such as the production of desired alkalinity.

Another object is to provide a method of treating water to render such constituents as calcium and magnesium bicarbonates innocuous as far as concerns their hardening action but without their removal from the water, i. e., to repress hardening, or soap-consuming and curd-forming, action of hardening constituents without precipitating them from the water.

A further object is to provide for easy, rapid, and cheap removal of grease, oil, dirt, and other soiling agents from textiles, wood, glass, and other solids without damage thereto.

Yet another object is to provide a method of the type referred to which is applicable to both manual and automatic operation.

A further object is to provide a new composition of matter for practicing the method provided by the invention, which is cheap, readily prepared, highly efficient, and useful not only in laundering and other detergent operations, but also as a paint, varnish and grease remover, and which is not injurious to the materials treated or the hands of the user.

Water containing hardening constituents, usually alkaline earth metal salts, commonly the bicarbonates of calcium and magnesium, is objectionable for such purposes as cleansing operations because the hardening constituents are soap-consuming and form objectionable products with soap.

Various ways of treating hard water to overcome its objectionable properties have been proposed and used. For example, water may be heated or distilled to cause deposition of or to separate it from the dissolved hardening salts. These procedures are, however, slow, and relatively expensive, and for economical reasons they are not applicable on any considerable scale, at least for laundering and the like operations.

A commonly practiced method of softening water is to subject it to the action of zeolites. Despite their softening action, zeolite softeners are not free from objection because the zeolite becomes progressively less effective in use, whereby the hardness of the water may increase and even become objectionably high. For this reason the zeolite softeners require more or less frequent attention to maintain uniform softening action. Also, they are relatively expensive, particularly for large-scale installation.

The commonly practiced method of softening water is to treat it with various chemicals, either singly or in combination, examples being soda ash, aluminum sulfate, sodium aluminate, various alkali metal phosphates, and others. All such treatments aim to soften the water by precipitation of the calcium and magnesium or other alkaline earth salts contained in the water. Such precipitates should be removed from the water where it is to be used for many purposes, as in the laundering of fine fabrics or in the processes involved in the manufacture of fabrics because otherwise they will become impounded in the fibers and cause them to be harsh and off-color. In the domestic softening of water it is usually not feasible to remove such precipitated matter, however, while in large-scale industrial and institutional operations the separation of the water from the precipitated hardening constituents may be a slow operation and involve expensive equipment. Some of these reagents, such as metaphosphates, are objectionable also in that although they soften the water adequately, excessive amounts of water are necessary to thoroughly remove the suds from fabrics in rinsing operations, thus increasing costs through added water consumption and extra time and labor involved.

The invention is predicated upon my discovery that its stated objects may be attained by the use of sulfonated petroleum products in conjunction with an alkali. Through the use of this combination of reagents the hardening constituents of water lose their hardening action with complete, or substantially complete, elimination of the objections encountered both in the use of untreated water as well as in the water-treating or softening processes available prior to my invention. For example, in laundering operations with ordinary hard water the alkaline earth metals salts react with the fatty acid of soap to form insoluble, curdy, calcium or magnesium soaps. This is objectionable in part because soap is consumed thereby without producing any cleansing action, and particularly because the curdy precipitates tend to be deposited in and retained by the fibers of the fabrics being laundered. Or, where water used in laundering operations is treated with softening chemicals, the hardening constituents are precipitated upon the fibers.

Through the practice of this invention the hardening constituents contained in the water are not precipitated therefrom, but remain soluble, and are not converted into curdy or other objectionable form. In fact, the hardening constituents appear to remain completely soluble so that they are not deposited upon the materials being laundered or the apparatus in which such operations are conducted. As far as I have been able to determine, the hardening constituents are in some manner converted to a form which is not substantially ionized in the water although apparently they are not altered chemically.

Moreover, the use of the composition provided by the invention reduces the surface tension of the water, improves the detergent action of soap and requires the use of less soap than where the water is not so treated. In other words, the composition promptly and effectively represses the soap-consuming properties of the alkaline earth metal hardening constituents, permits all of the soap used to exert its soil-dispersing cleansing action, and assists in the production and maintenance of lather. Furthermore, the strength of fabrics is not affected by the practice of the invention, and the alkalinity, or hydrogen ion concentration, of the water may be adjusted according to need.

The sulfonated petroleum product used in the practice of the invention may be produced intentionally from petroleum fractions and derivatives, a variety of such sulfonated products being available. Or, use is made of the sulfonates which are produced as by-product materials in standard processes of treating or purifying petroleum and other products. These latter may be used in the liquid form in which they are produced, or, if desired, their water content may be removed to produce a dry sulfonate. The sulfonates used in the practice of the invention are those which are water soluble and substantially neutral, and, generally speaking, they may be designated by the empirical formula $R—SO_3—Na$ in which $R$ is a hydrocarbon radical containing an average of 16 carbon atoms.

When such a sulfonated petroleum product is added to water it exerts an action by which the surface tension of the water is reduced below that of water treated in other ways, and even below that of rain water. This may be demonstrated by adding the sulfonated petroleum product to hard water, and upon shaking the mixture in a bottle without the addition of any soap solution or other material, a suds will form. However, the use of this constituent of the composition provided by the invention does not alone suffice to soften the water or produce the results which characterize the practice of the invention. That is, the sulfonated petroleum product does not itself suppress the soap-consuming properties of the alkaline earth water hardening compounds, and it does not supply the alkalinity which is desirable in laundering operations to build up the soap and cause the formation of a satisfactorily stable suds such as is necessary in effecting removal of the soil from the clothes or other fabrics being laundered.

As an illustration of this, an ordinary family washing machine was charged with its regular load of 16 gallons of water carrying 4 parts of alkaline earth metal bicarbonates per 100,000 parts of water. To this there were added ½ fluid ounce of the petroleum sulfonate used in the practice of the invention, and 4 ounces by weight of good quality soap flakes. The clothes were then placed in the washer and although a satisfactory suds was produced at first, the suds subsided in a short time, indicating that the calcium and magnesium present in the water and in the clothes had consumed all of the soap. The addition of another ½ fluid ounce of sulfonate did not effect the creation of further suds. More soap flakes were then added, and it was found that the total amount of soap flakes necessary to obtain a suds suitable for proper washing was the same as was necessary when no sulfonated petroleum product was used with the same type of water and soap.

I have found, however, that the objects of the invention are attained fully by the conjoint use of an alkali and the sulfonated petroleum product. These two constituents of the composition cooperate in some manner to completely soften the water without precipitation of the hardening constituents and without the formation of a precipitate upon the addition of soap, and thereby the objections heretofore encountered in the use of hard water and in the treatment of water to soften it are overcome.

The cooperative action of the two constituents of the composition is indicated clearly by the fact that although alkaline reagents normally tend to cause precipitation of the hardening constituents from the water, the composition in accordance with this invention neither precipitates the alkaline earth metal or other hardening salts dissolved in the water, nor causes the liberation of carbon dioxide due to decomposition of such salts when the water is treated, showing that the petroleum sulfonate acts in some manner to repress this normal action of the alkali. The two constituents of the composition thus coact in some manner, not only to repress the normal tendency of the calcium and magnesium salts to precipitate or to form curdy soaps, but also to completely soften the water and permit all of the soap to be applied to useful ends while still retaining the hardening salts in solution. As far as I am aware, the natural status, or condition, of the hardening salts is unchanged, and apparently they are not precipitated, dissociated or dispersed.

Another advantage of the composition is that the presence of the alkali neutralizes any acidity of the water, and by adjustment of the alkali content of the composition the degree of alkalinity desirable for particular laundering operations can be adjusted according to need while avoiding damage to the textile fibers.

In the preferred practice of the invention sodium silicate, in either liquid or solid form, is used as the alkali. I have found that this material is preferable for the purpose because less of it is required than in the case of some alkalies, whereby excessive alkalinity of the water is more surely avoided. This not only minimizes injury to the fabrics but also renders the use of the composition non-irritating to the skin of those who are conducting such operations.

The two constituents of the composition exert different effects and, as indicated hereinabove, when used together produce results not attained when used individually and without the other.

For example, sodium silicate does not reduce the surface tension of water although this is desirable in the production and maintenance of satisfactory suds. This result is contributed by the sulfonated petroleum product which likewise cooperates with the sodium silicate in eliminating the objectionable characteristics of the hardening constituents and retaining them in harmless form in the water.

The composition is added to water in amounts such as are necessary to counteract the hardening or soap-consuming action of the alkaline earth metal or other salts which cause the water to be hard. With all ordinary natural waters extremely small amounts suffice to permit the entire amount of soap used to exert its cleansing action. The elimination of precipitation of salts and soaps of alkaline earth metals improves the laundering or other cleansing operations, and otherwise confers benefits which will be understood by those skilled in the art. Other advantages will appear from the following examples.

In one test of the invention a composition in accordance with the invention was used in connection with home laundering with a standard family washing machine taking a charge of 16 gallons of water. In this test the amount of composition added to each 16 gallons of water varied from ½ to 1 fluid ounce, and the family wash was done each week over a period of several months. Throughout that time it was never necessary to add more than 1 fluid ounce of the composition to obtain suitably softened water and an abundant amount of fluffy, stable suds with from 4 to 6 ounces by weight of soap flakes. As compared with the results prior to practicing the invention, this represented a saving of from 35 to 50 per cent of the soap previously necessary to achieve the same result. It was found also that by adding the composition to the rinse waters there was progressive elimination of alkaline earth metal compounds that had been previously deposited in the fabrics, thus rendering them softer and requiring the use of less bluing which was also distributed more evenly.

In one institutional laundry having one large washing wheel having a capacity of about 300 to 350 pounds, a medium-sized wheel of about 200 pounds capacity, and one smaller wheel, which were used daily, the practice was to use a barrel of ordinary laundry alkali per month and to add sodium hexametaphosphate to the rinse water at the rate of 100 pounds per six weeks. Upon the adoption of the composition provided by this invention the use of alkali and sodium hexametaphosphate was discontinued, and the quality of the washings has improved. Over a period of five and a half months 120 gallons of composition in accordance with this invention sufficed to achieve these results.

In a large commercial laundry of the type supplying a coat, apron and towel service, considerable bleach was used together with a barrel of alkali each three weeks. Upon adoption of the composition provided by this invention the alkali consumption was decreased approximately 80 per cent, its use being confined to only the most severely soiled materials. Also, the bleach requirement was reduced substantially. This laundry found that the use of the composition provided by the invention resulted in more even distribution of the bluing, as well as a saving in soap amounting to 30 to 35 per cent of that used theretofore. They report also that the fabrics are softer than prior to adoption of the invention, and attribute this to the removal of calcium soap formation and calcium deposits previously picked up by the fabrics.

In a large institutional laundry where exceptionally large washing wheels were in use it was necessary, because of lack of sufficient washers and the volume of materials to be laundered, to run the break operation only five minutes instead of ten minutes as usual. The materials laundered were known to have calcium soap impounded in them, making them harsh and of greyish color. Within a few days after beginning to use the composition provided by this invention the laundered products were noticeably softer, and within a couple of weeks were much whiter. At the same time, the consumption of soap was decreased approximately 25 per cent.

The composition may also be used advantageously in the break operation applied in commercial, institutional and other similar laundries, as well as an addition to water used in rinsing fabrics following laundering operations. When the invention is applied to the laundering of materials that have been previously laundered by other methods, it will be observed that the fabrics will become softer, fluffier and of improved color, due, apparently, to removal of the alkaline earth metal salts and soaps previously deposited upon and retained in the fibers, which is indeed a desirable result.

Although the invention has been described with reference to the addition of a composition of the two constituents, this is not necessary to its practice because suitable proportions of the sulfonated petroleum product and of the sodium silicate, or other alkali, may be added individually. Ordinarily, however, this is more troublesome, particularly in reaching a balanced treatment, for which reason it is preferred to use a composition comprising both ingredients.

The proportion of the composition which is added to water will depend upon the purpose to which it is to be applied. For extremely soiled clothes which are to be laundered, for example, more may be added than with ordinarily soiled clothes. Also, in the washing of walls, woodwork, floors, and the like, the proportions in which the composition is added to water may be varied depending upon the character of the cleaning operation, the more severe the character of the cleaning, the higher the proportion of composition used. I have found that the composition is suitable not only for the treatment of water, but possesses as well properties as a paint and varnish remover, as well as being capable of removing grease from machinery, walls, floors, and the like.

Water treated in accordance with the invention is particularly suited to textile preparation and processing. For example, as compared with other waters it acts as a dye leveling medium, and, generally, to produce superior products.

Compositions provided by the invention may be dosed manually to the water to be treated, for example when used for domestic purposes. Also, they are adapted to automatic dosing in liquid form, as by feeding dispensers and the use of a pitot tube as an injecting means, using it with the water pressure to inject the composition into a water line.

The petroleum sulfonate preferably used is a commercially available liquid containing about 34 per cent of petroleum sulfonate, 6 per cent of sodium sulfate, and 60 per cent of water. For most purposes I prefer to mix one part by weight of it with two parts by weight of sodium silicate, and water may be added in an amount to adjust the alkalinity-imparting property of the mixture. The proportions may be adjusted otherwise, however, according to the use to which the composition is to be put.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. A method of treating water consisting of adding thereto a composition comprising sodium silicate and a petroleum sulfonate product composed of about 85 percent petroleum sulfonate and about 15 percent sodium sulfate and water to form a solution thereof.

2. A method of treating water consisting of adding thereto a composition comprising sodium silicate and a petroleum sulfonate product consisting of about 34 percent petroleum sulfonate, 6 percent sodium sulfate and 60 percent water.

3. A water treating composition comprising sodium silicate and a petroleum sulfonate product composed of about 85 percent petroleum sulfonate and about 15 percent sodium sulfate and water to form a solution thereof.

4. A water treating composition comprising sodium silicate and a petroleum sulfonate product composed of about 34 per cent of petroleum sulfonate, 6 per cent of sodium sulfate, and 60 per cent of water.

EDWARD R. WILLIAMS.